Inventor:
JAKOB KÄGI

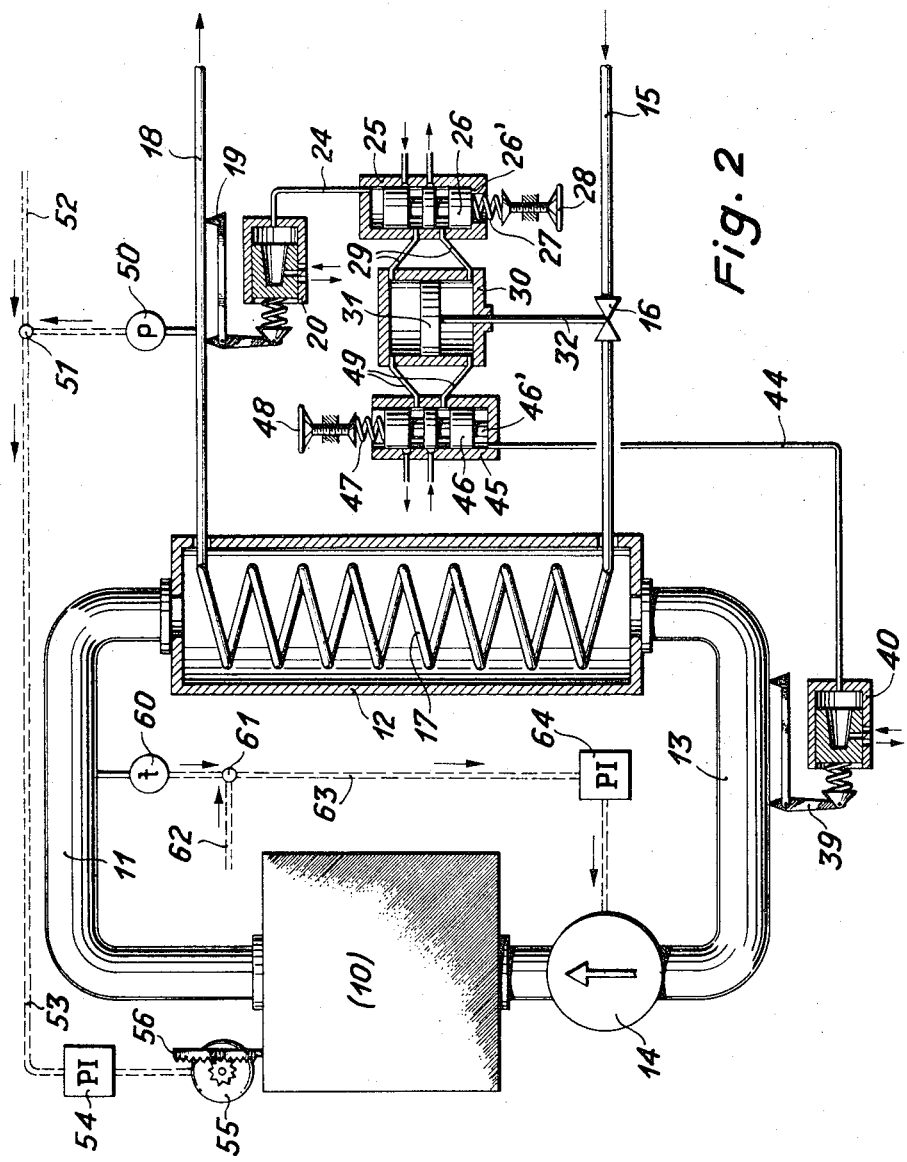

United States Patent Office 3,369,971
Patented Feb. 20, 1968

3,369,971
APPARATUS FOR CONTROLLING A NUCLEAR
REACTOR PLANT
Jakob Kägi, Wiesendangen, Zurich, Switzerland, assignor to Sulzer Brothers, Limited, Winterthur, Switzerland, a corporation of Switzerland
Filed Oct. 28, 1964, Ser. No. 407,004
Claims priority, application Switzerland, Oct. 30, 1963, 13,290/63
4 Claims. (Cl. 176—60)

The present invention relates to a method of and apparatus for controlling a nuclear reactor plant wherein a coolant flows through the reactor for receiving heat therefrom, the heat absorbed by the coolant is transferred to the operating medium of a forced flow vapor generator, and the temperature of the coolant leaving the reactor is controlled.

With the method according to the invention the supply of operating medium to the vapor generator is controlled in response to at least one temperature of the vapor produced in the vapor generator, if this temperature is below a predetermined value, and the supply of operating medium to the vapor generator is controlled at least in response to the temperature of the coolant leaving the vapor generator, if this coolant temperature exceeds a predetermined value.

A nuclear reactor plant equipped with control apparatus according to the invention comprises a reactor, a forced flow vapor generator having heat-absorbing elements for heating, evaporating and superheating an operating fluid, and means for circulating a coolant through the reactor to be heated therein and through the vapor generator for supplying heat to said heat-absorbing elements. The control apparatus comprises a temperature-sensitive device connected to the vapor generator for sensing the temperature of the superheated vapor, a temperature-sensitive device connected to said coolant-circulating means for sensing the temperature of the coolant leaving the vapor generator, and a device actuated by said temperature-sensitive devices for controlling the supply of operating medium to the vapor generator in response to the temperature measured by the first-mentioned temperature-sensitive device when the superheat temperature is below a predetermined value and for controlling the supply of operating medium to the vapor generator at least in response to the temperature measured by the second-mentioned temperature-sensitive device when the temperature of the coolant leaving the vapor generator is above a predetermined value.

The device actuated by the temperature-sensitive devices includes two integration elements, one of which is operatively connected to the superheat temperature-sensitive device and the second of which elements is operatively connected to the coolant temperature-sensitive device, each integration element being provided with a means for adjusting the aforementioned respective predetermined temperature.

In a preferred embodiment of the invention a device actuated by the temperature-sensitive devices is provided which comprises only one integration element which receives and adds signals produced by the temperature-sensitive devices. An apparatus implementing this embodiment is of simple structure and is very reliable.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a diagrammatic part-sectional illustration of a nuclear reactor plant including a forced flow vapor generator and a control apparatus having two integration elements for controlling the supply of operating medium to the vapor generator.

Figure 1:
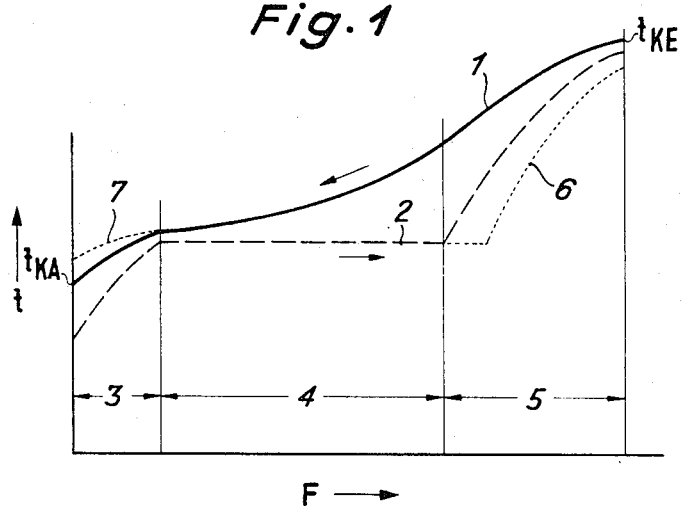
FIG. 1 is a diagram illustrating the problems the solution of which is the object of the present invention.

Referring more particularly to the diagram FIG. 1, the abscissa F represents the heating surfaces of a forced flow vapor generator wherein the heating surfaces are arranged in series relation with respect to the flow of the operating medium and which are also arranged in series relation with respect to the coolant heating the heating surfaces and in such manner that pure counterflow prevails between the operating medium of the vapor generator and the reactor coolant. The ordinates of the diagram FIG. 1 represent the temperatures of the coolant of the nuclear reactor and of the operating medium of the vapor generator. The solid line 1 corresponds to the temperatures of the reactor coolant which enters the vapor generator at a temperature of $t_{KE}$, is cooled by heat transfer to the operating medium of the vapor generator and which leaves the vapor generator at the temperature $t_{KA}$. The operating medium of the vapor generator passes consecutively through heating surfaces, 3, 4 and 5 wherein the operating medium is preheated, evaporated and superheated, respectively. The temperature of the operating medium of the vapor generator is represented by the dotted line 2. It has been found that when too much liquid operating medium is fed into the vapor generator the location where evaporation is completed moves into the superheater 5 and the temperature of the live vapor changes considerably as shown by the dotted line 6 in FIG. 1. If, in a vapor generator, the rate of supply of feedwater is below the required rate, there is no such considerable change of the live vapor temperature; the difference between the temperatures of the operating medium and of the coolant entering the vapor generator is much less if too little liquid operating medium is supplied than if too much liquid operating medium is supplied. The temperature of the coolant leaving the vapor generator is close to the temperature of the operating medium entering the vapor generator when there is too much feedwater fed into the vapor generator, whereas if there is too little feedwater fed into the vapor generator the temperature of the coolant deviates considerably from the temperature of the operating medium as indicated by line 7 in FIG. 1.

It is an object of the invention to provide a method of and means for limiting the above-described variations of the temperatures of the operating medium and of the coolant whereby the simple counterflow arrangement is retained.

Referring more particularly to FIG. 2 of the drawing, numeral 10 represents a nuclear reactor and numeral 12 a forced flow vapor generator. The heat generated in the reactor 10 is absorbed by a preferably gaseous coolant which is circulated by means of a blower or other suitable device 14 from the vapor generator 12 through a conduit 13, the reactor 10, a conduit 11, the vapor generator 12 and therefrom into the conduit 13. The coolant heated in the reactor 10 transfers its heat to a tube system 17 forming part of the vapor generator 12 and conducting a vaporizable operating medium, for example water. The operating medium is preheated, evaporated and superheated in the tube system 17. The liquid operating medium is fed into the system 17 by means of a feed pipe 15 close to the location where the reactor coolant leaves the vapor generator 12, i.e., at a location where the coolant has transferred the heat absorbed in the reactor substantially completely to the operating medium of the vapor generator. Close to the coolant inlet of the vapor generator a live vapor pipe 18 is connected to the tube system 17 for conducting the vapor to one or more consumers, not shown, for example, a turbine.

A pressure-sensitive device 50 is connected to the live vapor pipe 18 and produces a signal corresponding to the pressure in the pipe 18 which signal is compared in a conventional device 51 with a set point signal arriving through a conduit 52. A signal corresponding to the result of this comparison is conducted through a conduit 53 to a proportional-integral (PI) regulator 54 which actuates a motor 55 operating a control rod 56. Depending on change of the position of the control rod 56 of which a plurality may be provided, the neutron flux in the reactor core changes and therefore also the reactor output. The present invention is not limited to the aforesaid type of regulating the reactor output; the output may be controlled in response to values other than vapor or steam pressure.

For controlling the temperature of the coolant leaving the reactor a temperature-sensitive device 60 is connected to the conduit 11 and produces a signal corresponding to the coolant temperature. This signal is compared in a conventional device 61 with a set point signal supplied through a conduit 62. The signal resulting from this comparison is conducted through a conduit 63 to a PI-regulator 64 which adjusts the output of the blower 14, for example by speed regulation thereof, in response to the signal in the conduit 63. The invention is not limited to this particular temperature regulation of the reactor coolant; this temperature regulation may be based on values other than the temperature in the conduit 11.

A temperature sensor 19 is connected to the live vapor pipe 18 and acts on a control device 20. This device has an inlet and an outlet for a pressure fluid and is connected through a pipe 24 to a piston valve cylinder 25 which forms together with a servomotor having a cylinder 30 and piston 31 therein one of two integration elements of the apparatus for controlling the rate of supply of operating medium to the vapor generator. In the device 20 pressure signals are produced corresponding to the vapor temperature in the pipe 18. The pressure signals are conducted through the pipe 24 to the piston valve cylinder 25 whose piston 26, in the position shown which corresponds to normal operation of the plant, rests on an abutment 26' provided in the housing of the control piston. A spring 27 whose force can be adjusted by manipulation of a hand wheel 28 tends to remove the piston 26 from the abutment 26'. The force of the spring 27 counteracts the pressure in the pipe 24. The control piston cylinder 25 is connected through two pipes 29 to the hydraulic servomotor cylinder 30 wherein the piston 31 is movable which actuates a valve 16 in the feed pipe 15 through a piston rod 32.

A temperature sensor 39 is connected to the conduit 13 which conducts the coolant which has been cooled in the vapor generator 12. The sensor 39 is preferably of the same type as the sensor 19 in the live vapor pipe 18. The sensor 39 is connected to a control device 40 producing pressure signals corresponding to the temperature of the coolant. These signals are supplied through a conduit 44 to a piston valve cylinder 45 which constitutes together with the servomotor 30, 31 the second integration element of the operating medium supply regulating system according to the invention. A spring 47 presses against the end of a control piston 46 which is opposite to the end whereon the pressure signals arriving through the conduit 44 act. The force of the spring 47 can be adjusted by manipulating a hand wheel 48. In the position shown in FIG. 2 the piston 46 rests on an abutment 46'. The piston valve cylinder 45 is connected through two pipes 49 to the servomotor cylinder 30.

If there is an excess of liquid supplied to the vapor generator 12, i.e., if the rate of flow of operating medium through the vapor generator is too great in relation to the heat supplied by the coolant the vapor temperature in the pipe 18 drops and the force of the spring 27 exceeds the pressure in the pipe 24 so that the control piston 26 moves upward as seen in FIG. 2. This causes flow of a pressure fluid into the space on top of the piston 31 so that the latter is pressed downward and reduces the flow area of the valve 16 until the temperature of the pipe 18 corresponds to the temperature adjusted by the hand wheel 28 and the piston 26 rests once more on the abutment 26'. During this operation the control piston 46 has not moved.

If not enough liquid is fed into the vapor generator 12, i.e., if the rate of supply of liquid operating medium is too little compared with the available heat, the temperature in the pipe 18 rises and the pressure signal in the pipe 24 increases; the control piston 26 remains on the abutment 26'. Rising temperature in the pipe 18 causes rising of the temperature of the coolant in the pipe 13 so that the pressure signal in the pipe 44 increases. If the pressure in the pipe 44 exceeds the force of the spring 47 the control piston 46 is moved upward as seen in FIG. 2 and pressure fluid is conducted to the underside of the piston 31. The latter is thereby moved upward and the flow area of the valve 16 is increased until the temperature of the coolant in the pipe 13 has reached the temperature defined by the position of the hand wheel 48 and the piston 46 rests once more on the abutment 46'.

In the arrangement according to FIG. 2 the temperatures defined by the hand wheels 28 and 48 must be so far apart that the control pistons 26 and 46 cannot move upward simultaneously. It is within the scope of the invention to re-adjust the temperatures defined by the hand wheels 28 and 48 when the load on the plant changes. In this case it is advisable to actuate the wheels 28 and 48 simultaneously with a load control device.

Figure 3:
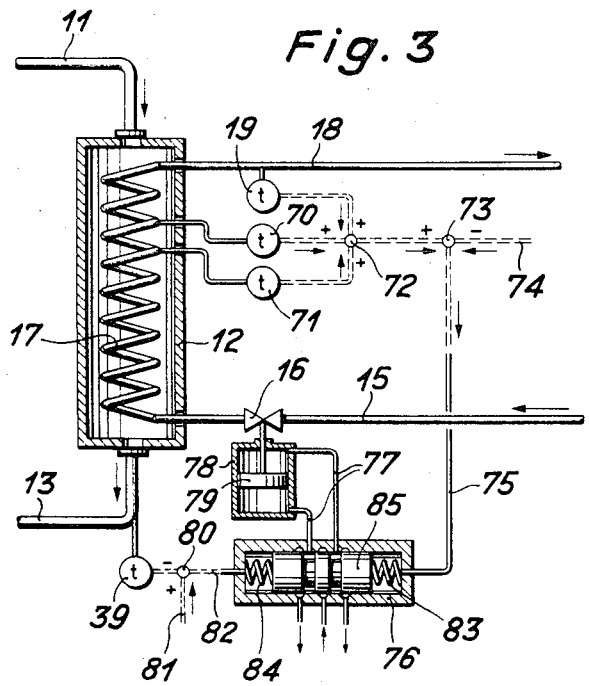
FIG. 3 is a diagrammatic illustration of a nuclear reactor plant including a forced flow vapor generator and a modified control apparatus including one integration element for controlling the supply of operating medium to the forced flow vapor generator.

In the plant shown in FIG. 3 the reactor and the vapor generator are similarly arranged as in the plant shown in FIG. 2. In addition to the temperature sensor 19 connected to the live vapor pipe 18 two temperature sensors 70 and 71 are connected to two spaced points of a part of the tube system 17 conducting superheated vapor. The signals produced in the three temperature sensors are combined in a device 72 which forms the sum of the signals. This sum is compared in a device 73 with a set point signal arriving through a signal conduit 74. In the device 73 a pressure signal is produced corresponding to the result of this comparison and is conducted through a pipe 75 to a control valve having a cylinder 76 which forms an integration element of the system according to the invention for controlling the rate of operating medium supply to the vapor generator. Two pressure fluid conduits 77 connect the control valve cylinder 76 to a hydraulic servomotor cylinder 78 wherein a piston 79 is movable which actuates the feed valve 16 in the feed pipe 15.

As in the system shown in FIG. 2, a temperature sensor 39 is connected to the conduit 13 conducting the cooled coolant. The signal produced by the sensor 39 is compared in a device 80 with a set point signal supplied through a conduit 81. A pressure signal corresponding to the result of this comparison is conducted through a pipe 81 to the control valve cylinder 76. The pressure signals in the pipes 75 and 82 are added by acting on opposite sides of a control piston 85 forming part of the control valve. The ends of the piston 85 rest on springs 83 and 84. Depending on the position of the piston 85 the supply to and release of pressure fluid from the servomotor cylinder 78 is controlled.

If too much liquid is fed into the vapor generator 12, the point where evaporation is completed in the tube system 17 moves toward the outlet of the tube system and the temperatures sensed by the sensors 71, 70 and 19 drop. The pressure signal in the pipe 75 becomes smaller and the control piston 85 is moved to the right as seen in FIG. 3 so that pressure fluid can pass to the underside of the piston 79. This causes upward movement of the piston 79 and reduction of the flow area of the valve 16 until the piston 85 has returned to its middle position. The slight temperature drop of the coolant in the conduit 13 caused by overfeeding of the tube system 17 has the same effect as a temperature reduction in the superheating part of the system 17 but to a considerably smaller extent.

Underfeeding of the vapor generator 12 causes increase of the temperature of the coolant in the conduit 13 so that the pressure signal in the conduit 82 becomes smaller and the control piston 85 moves to the left in FIG. 3. This movement is somewhat aided by the pressure signal in the pipe 75 which has become greater because of the simultaneous rise of the temperature at the sensors 71, 70 and 19. Pressure fluid flows now into the space above the piston 79, moving the piston downward and increasing the flow area of the valve 16 until the piston 85 has returned to its middle position.

The set point signals supplied through the conduits 74 and 81 may be derived from a load control device producing signals corresponding to changes of the load. The output signals of the temperature sensors 71, 70 and 19 and the output signal of the temperature sensor 39 are algebraically added by subtracting the negative value of the output signal of the sensor 39 from the sum of the absolute output signals of the sensors 71, 70 and 19. The pressure signal resulting from this algebraic addition is supplied to the control valve cylinder 76.

The invention is not limited to implementation by the described hydraulic apparatus; without departing from the scope of the invention, it may be implemented by conventional pneumatic or electrical devices, or a combination thereof.

I claim:
1. In a nuclear reactor plant having a nuclear reactor, a forced flow vapor generator including tubular heat-absorbing elements conducting an operating medium, and means for circulating a coolant through said nuclear reactor for receiving heat therefrom and through said vapor generator for transferring heat received in said reactor to the operating medium conducted by said tubular heat-absorbing elements for heating, evaporating, and superheating the operating medium;
    valve means for controlling the supply of operating medium to said tubular heat-absorbing elements,
    a device operatively connected to said valve means for actuating said valve means to vary the supply of operating medium to said elements,
    a first temperature-sensitive means connected to a portion of said tubular elements outside said vapor generator for sensing the temperature of superheated operating medium leaving said vapor generator, said first temperature-sensitive means being operatively connected to said device for actuating said valve means in response to a temperature less than a first predetermined temperature to decrease the supply of operating medium,
    and, a second temperature-sensitive means connected to said coolant circulating means for sensing the temperature of coolant leaving said vapor generator, said second temperature-sensitive means being operatively connected to said device for actuating said valve means in response to a temperature above a second predetermined temperature to increase the supply of operating medium.

2. In a nuclear reactor plant as set forth in claim 1 wherein said device includes a first means operatively connected to said first temperature-sensitive means for actuation thereby, said first means having a cylinder, a slidably mounted piston in said cylinder disposed on an abutment therein to define said first predetermined temperature, and a spring biased against said piston to move said piston away from said abutment upon sensing of a temperature below said first predetermined temperature in said first temperature-sensitive means and a second means operatively connected to said second temperature-sensitive means for actuation thereby, said second means having a second cylinder, a second slidably mounted piston in said second cylinder disposed on a second abutment therein to define said second predetermined temperature and a second spring biased against said second piston to move said second piston away from said second abutment upon sensing a temperature above said second predetermined temperature in said second temperature-sensitive means whereby said first and second pistons actuate said valve means to vary the supply of operating medium upon movement thereof.

3. In a nuclear reactor as set forth in claim 1 wherein said device includes a cylinder, a slidably mounted piston in said cylinder operatively disposed between said first and second temperature-sensitive means, a first spring resting on one side of said piston to define said first predetermined temperature and to bias said piston in one direction upon sensing of a temperature below said first predetermined temperature in said first temperature-sensitive means and a second spring resting on the opposite side of said piston to define said second predetermined temperature and to bias said piston in a direction opposite said one direction upon sensing of a temperature above said second predetermined temperature in said second temperature-sensitive means whereby said piston actuates said valve means upon movement thereof.

4. In a nuclear reactor plant as defined in claim 1, said device including means for stopping actuation of said device in response to said first temperature-sensitive means upon sensing of a superheated operating medium temperature in excess of said first predetermined temperature and means for stopping actuation of said device in response to said second temperature-sensitive means upon sensing of a coolant temperature below said second predetermined temperature.

References Cited
UNITED STATES PATENTS

| 3,070,536 | 12/1962 | Taylor et al. | 176—20 |
| 3,150,642 | 9/1964 | Profos | 176—60 |
| 3,255,084 | 6/1966 | Doroszlai | 176—20 |
| 3,240,675 | 3/1966 | Weber | 176—20 |

FOREIGN PATENTS

| 230,646 | 2/1959 | Australia. |
| 632,488 | 10/1963 | Belgium. |

CARL D. QUARFORTH, *Primary Examiner.*
L. DEWAYNE RUTLEDGE, *Examiner.*
H. E. BEHREND, *Assistant Examiner.*